US012048942B1

(12) United States Patent
Höll

(10) Patent No.: US 12,048,942 B1
(45) Date of Patent: Jul. 30, 2024

(54) APPARATUS FOR MIXING STREAMS OF GAS AND POWDER UTILIZING A VORTEX

(71) Applicant: Helmut P. Höll, Rapid City, SD (US)

(72) Inventor: Helmut P. Höll, Rapid City, SD (US)

(73) Assignee: VRC Metal Systems, LLC, Box Elder, SD (US)

( * ) Notice: Subject to any disclaimer, the term of this patent is extended or adjusted under 35 U.S.C. 154(b) by 891 days.

(21) Appl. No.: 17/097,190

(22) Filed: Nov. 13, 2020

(51) Int. Cl.
*B05B 7/00* (2006.01)
*B01F 25/10* (2022.01)
*B05B 7/14* (2006.01)
*B01F 25/00* (2022.01)

(52) U.S. Cl.
CPC .............. *B05B 7/144* (2013.01); *B01F 25/10* (2022.01); *B01F 2025/911* (2022.01); *B01F 2025/913* (2022.01); *B01F 2025/914* (2022.01)

(58) Field of Classification Search
CPC .... B01F 5/144; B01F 25/10; B01F 2025/911; B01F 2025/914; B01F 2025/913
See application file for complete search history.

(56) References Cited

U.S. PATENT DOCUMENTS

| | | | |
|---|---|---|---|
| 1,947,487 A | 2/1934 | Newhouse | |
| 2,801,134 A | 7/1957 | Neugebauer | |
| 3,937,405 A | 2/1976 | Stephanoff | |
| 4,406,410 A | 9/1983 | Larson | |
| 5,120,582 A | 6/1992 | Browning | |
| 5,302,414 A | 4/1994 | Alkhimov | |
| 6,074,085 A | 6/2000 | Scarpa | |
| 6,796,704 B1 * | 9/2004 | Lott | B01F 25/10 366/165.2 |
| 6,915,964 B2 | 7/2005 | Tapphorn | |
| 9,751,064 B2 | 9/2017 | De Wilde | |
| 9,802,166 B2 | 10/2017 | Hammerlund | |
| 10,441,962 B2 | 10/2019 | Widener | |

* cited by examiner

*Primary Examiner* — Anshu Bhatia
(74) *Attorney, Agent, or Firm* — Jeffrey A. Proehl; Woods, Fuller, Shultz & Smith, PC

(57) ABSTRACT

A mixing device may define a mixing chamber including a vortex mixing portion, a primary gas path along which a first gas stream moves to the vortex mixing portion, and a secondary gas path along which a second gas stream moves to the vortex mixing portion. The mixing device may have a mixer body, an outer gas guide positioned in the mixer body to guide the second gas stream to the vortex mixing portion, and an inner gas guide at least partially positioned in the mixer body to guide the first gas stream to the vortex mixing portion. A portion of the inner gas guide may be positioned in the outer gas guide to form an annular gap between the gas guides to define the secondary gas path about the primary gas path to create a vortex of the first and second gas streams in the vortex mixing portion.

21 Claims, 9 Drawing Sheets

APPARATUS FOR MIXING STREAMS OF GAS AND POWDER UTILIZING A VORTEX

BACKGROUND

Field

The present disclosure relates to mixing devices and more particularly pertains to a new apparatus for mixing streams of gas and powder utilizing a vortex for enhancing the characteristics of the particle stream produced by the apparatus for processes such as cold spray material deposition.

SUMMARY

In one aspect, the present disclosure relates to a mixing device for combining a first gas stream and a second gas stream into a mixed gas stream, with the mixing device having an input opening for receiving the first gas stream, a secondary input opening for receiving the second gas stream, and an output opening for outputting the mixed gas stream. The mixing device may define a mixing chamber including a pre-mixing portion and a vortex mixing portion, with the mixing chamber being in fluid communication with the input opening and the output opening. The mixing device may define a primary gas path along which the first gas stream moves, and the primary gas path may extend from the input opening to the vortex mixing portion of the mixing chamber. The mixing device may also define a secondary gas path along which the second gas stream moves, and the secondary gas path may extend from the secondary input opening to the vortex mixing portion of the mixing chamber. The secondary gas path may be in communication with the primary gas path at the vortex mixing portion of the mixing chamber. The mixing device may comprise a mixer body defining at least one of the portions of the mixing chamber, an outer gas guide positioned in the mixer body and being configured to guide the second gas stream through the premixing portion of the mixing chamber to the vortex mixing portion of the mixing chamber, and an inner gas guide at least partially positioned in the mixer body and being configured to guide the first gas stream through the premixing portion of the mixing chamber to the vortex mixing portion of the mixing chamber. A portion of the inner gas guide maybe positioned in the outer gas guide in a substantially concentric relationship with the outer gas guide to form an annular gap between the inner and outer gas guides, and the annular gap may form a portion of the secondary gas path about the primary gas path to create a vortex in the vortex mixing portion of the mixing chamber to mix the first and second gas streams.

In another aspect, the present disclosure relates to a powder spray applicator apparatus which may include a spray nozzle, a first conduit configured to carry a first gas stream, a second conduit configured to carry a second gas stream, and a mixing device for combining the first gas stream and the second gas stream into a mixed gas stream. The mixing device may have an input opening connected to the first conduit for receiving the first gas stream, a secondary input opening connected to the second conduit for receiving the second gas stream, and an output opening connected to the spray nozzle for outputting the mixed gas stream to the spray nozzle. The mixing device may define a mixing chamber including a pre-mixing portion and a vortex mixing portion, with the mixing chamber being in fluid communication with the input opening and the output opening. The mixing device may define a primary gas path along which the first gas stream moves, with the primary gas path extending from the input opening to the vortex mixing portion of the mixing chamber. The mixing device may define a secondary gas path along which the second gas stream moves, with the secondary gas path extending from the secondary input opening to the vortex mixing portion of the mixing chamber. The secondary gas path may be in communication with the primary gas path at the vortex mixing portion of the mixing chamber. The mixing device may comprise a mixer body defining at least one of the portions of the mixing chamber, an outer gas guide positioned in the mixer body and being configured to guide the second gas stream through the premixing portion of the mixing chamber to the vortex mixing portion of the mixing chamber, and an inner gas guide at least partially positioned in the mixer body and being configured to guide the first gas stream through the premixing portion of the mixing chamber to the vortex mixing portion of the mixing chamber. A portion of the inner gas guide maybe positioned in the outer gas guide in a substantially concentric relationship with the outer gas guide to form an annular gap between the inner and outer gas guides. The annular gap may form a portion of the secondary gas path about the primary gas path to create a vortex in the vortex mixing portion of the mixing chamber to mix the first and second gas streams.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
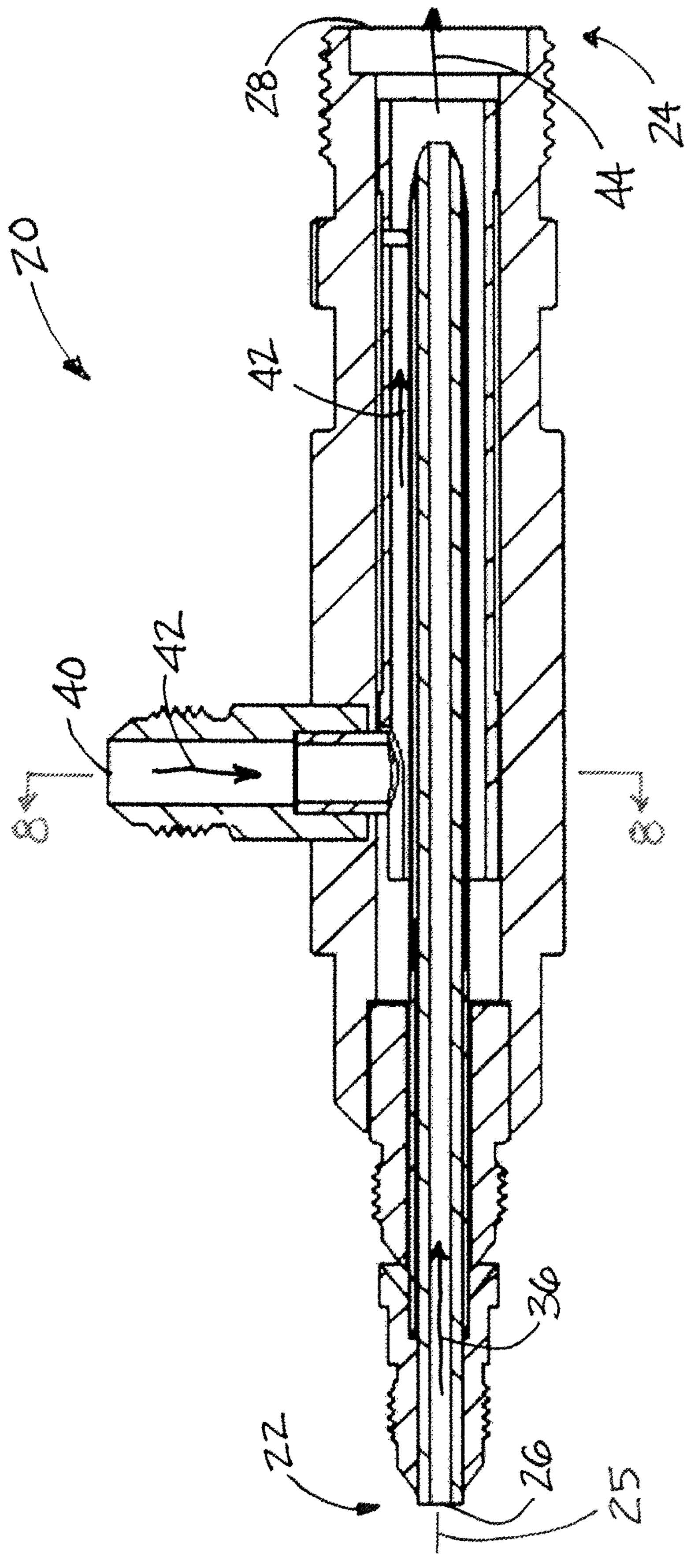
FIG. 1 is a schematic side sectional view of a mixing device for a new apparatus for mixing streams of gas and powder utilizing a vortex according to the present disclosure.
Figure 2:
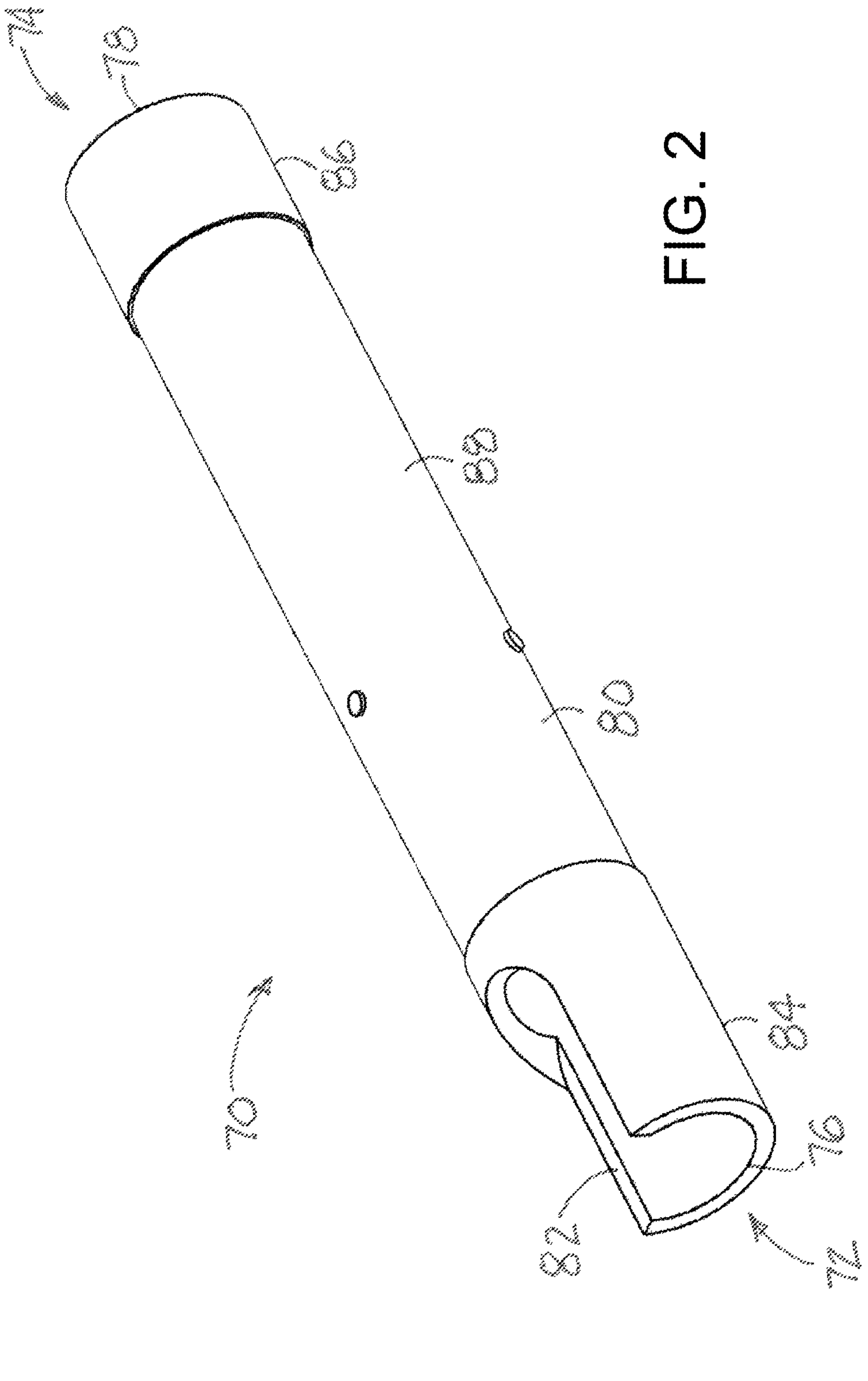
FIG. 2 is a schematic perspective view of an outer gas guide of the mixing device, according to an illustrative embodiment.
Figure 3:
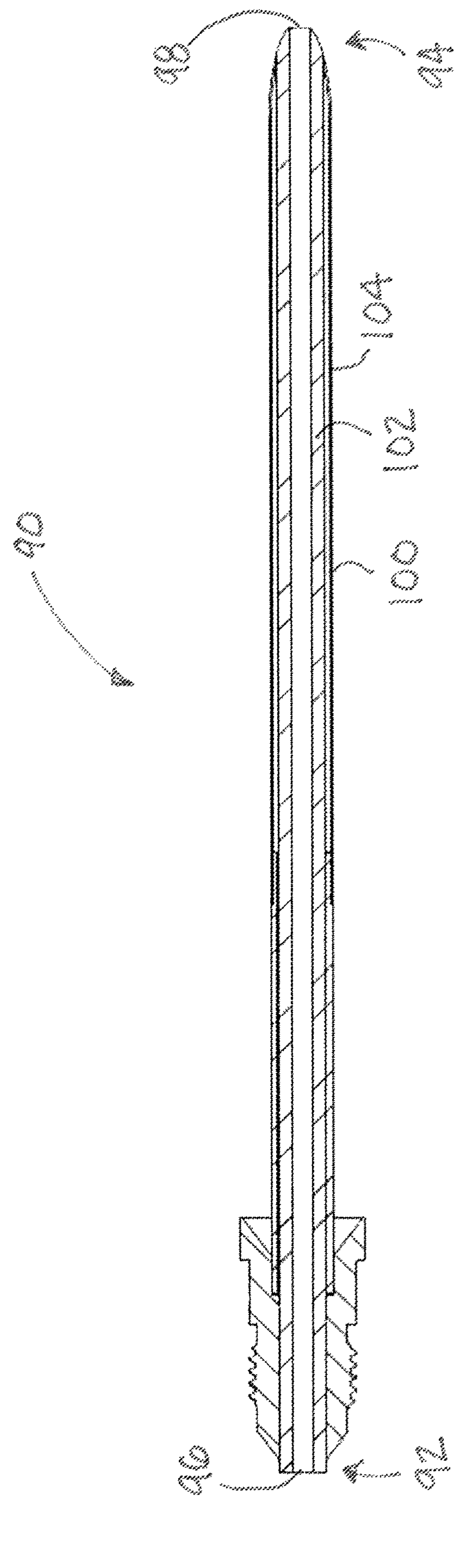
FIG. 3 is a schematic perspective view of an inner gas guide of the mixing device, according to an illustrative embodiment.
Figure 4A:
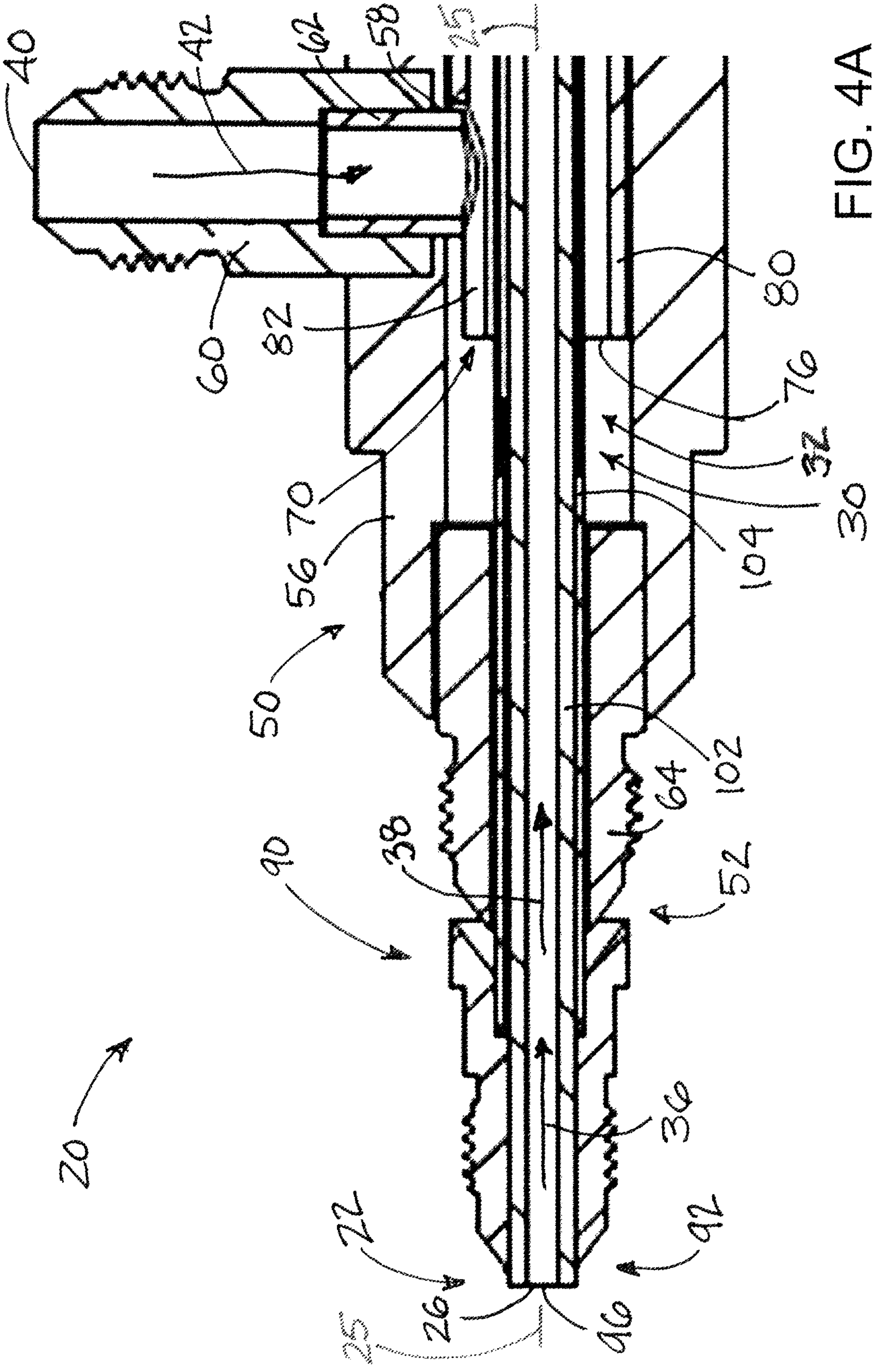
FIG. 4A is a schematic side sectional view of a portion of the mixing device, according to an illustrative embodiment.
Figure 4B:
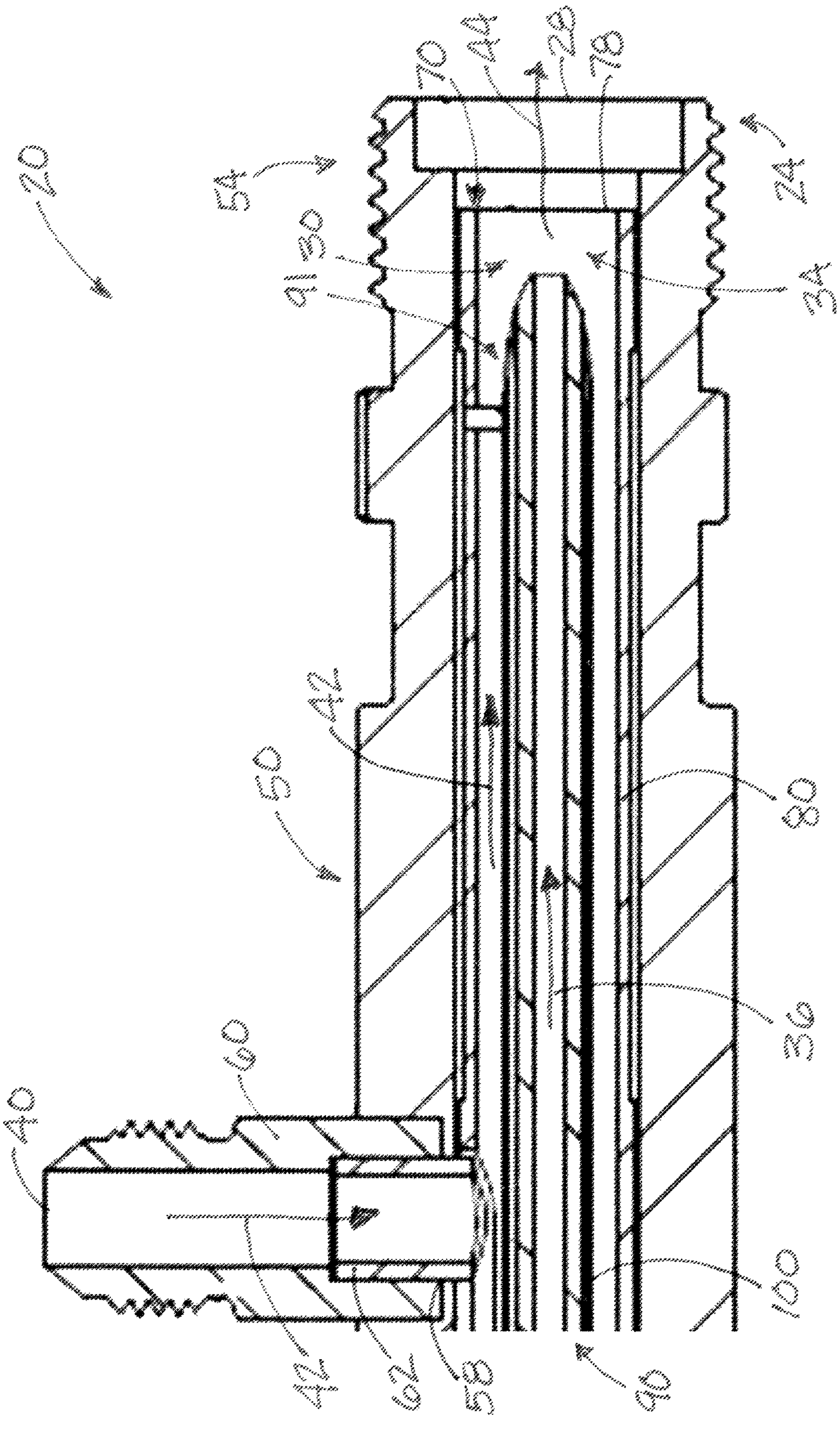
FIG. 4B is a schematic side sectional view of another portion of the mixing device, according to an illustrative embodiment.
Figure 5:
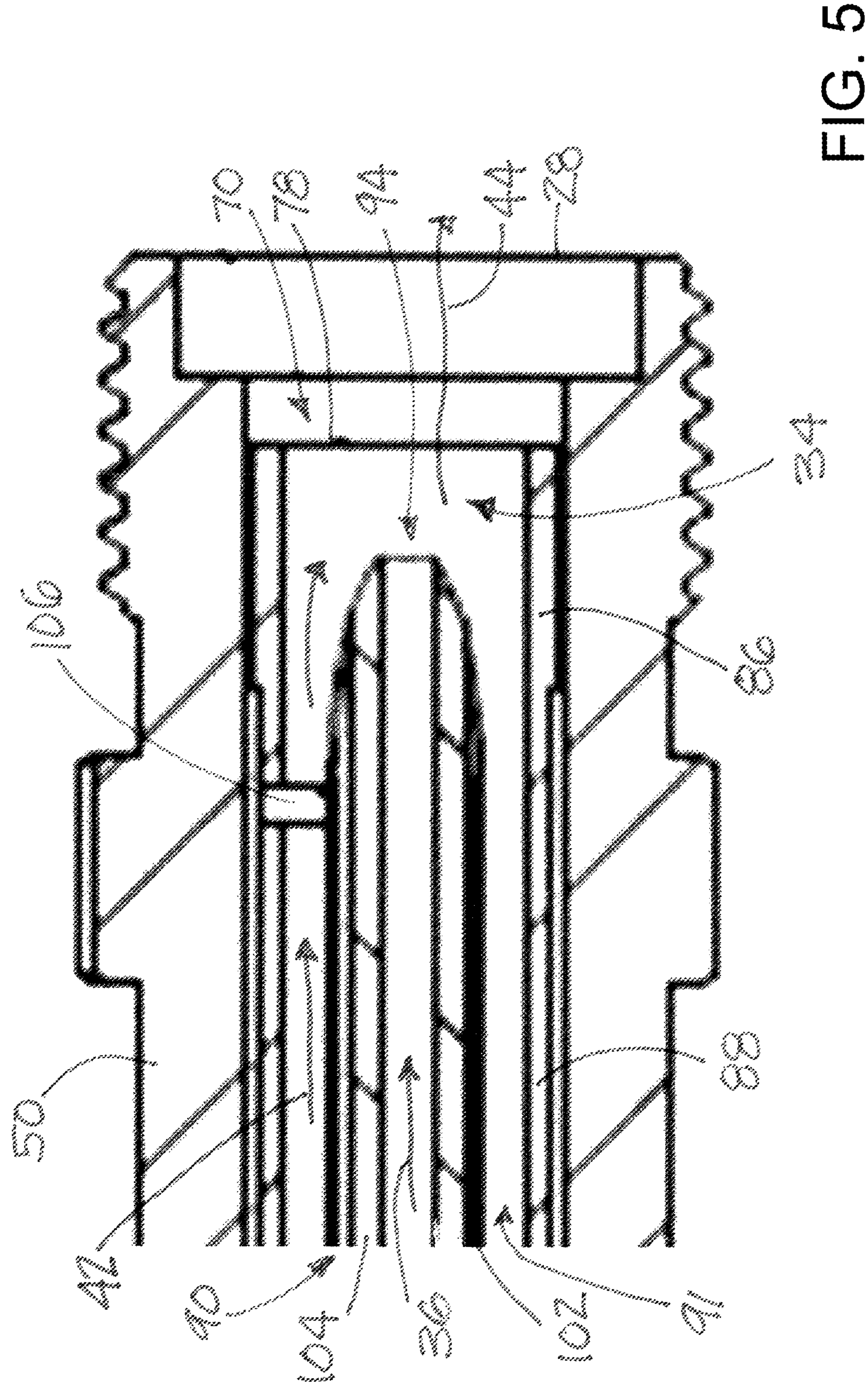
FIG. 5 is a schematic side sectional view of a section of the mixing device, according to an illustrative embodiment.
Figure 7:
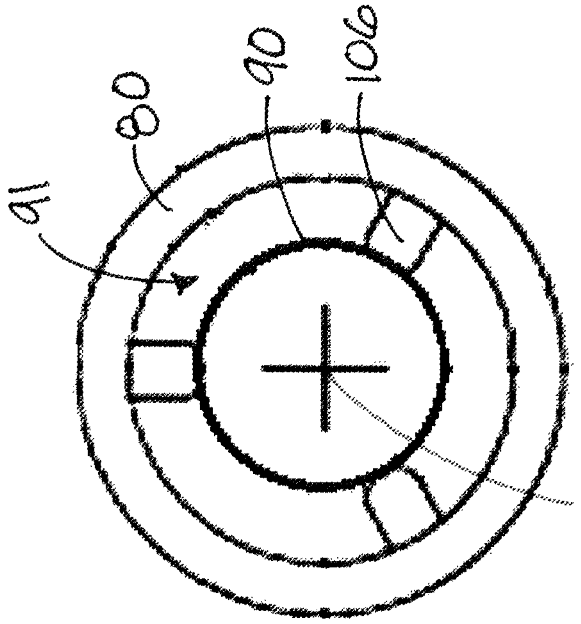
FIG. 7 is a schematic end view of the inner and outer gas guides isolated from other elements of the mixing device, according to an illustrative embodiment.
Figure 6:
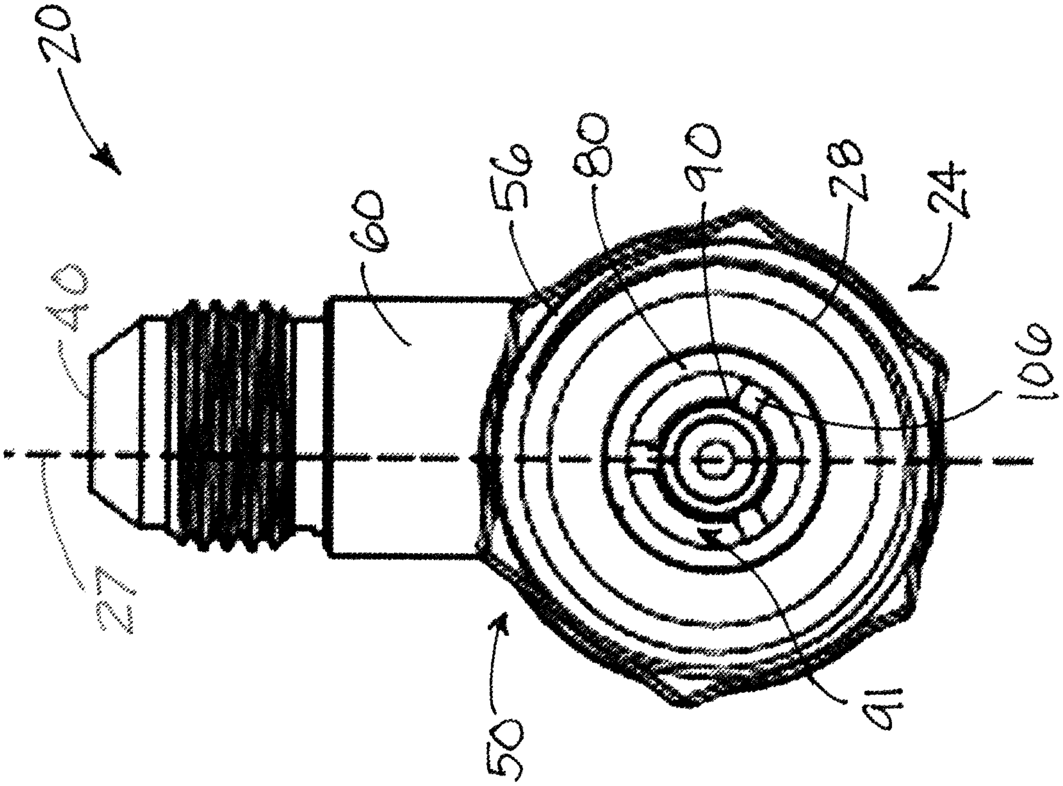
FIG. 6 is a schematic end view of the device, according to an illustrative embodiment.
Figure 8:
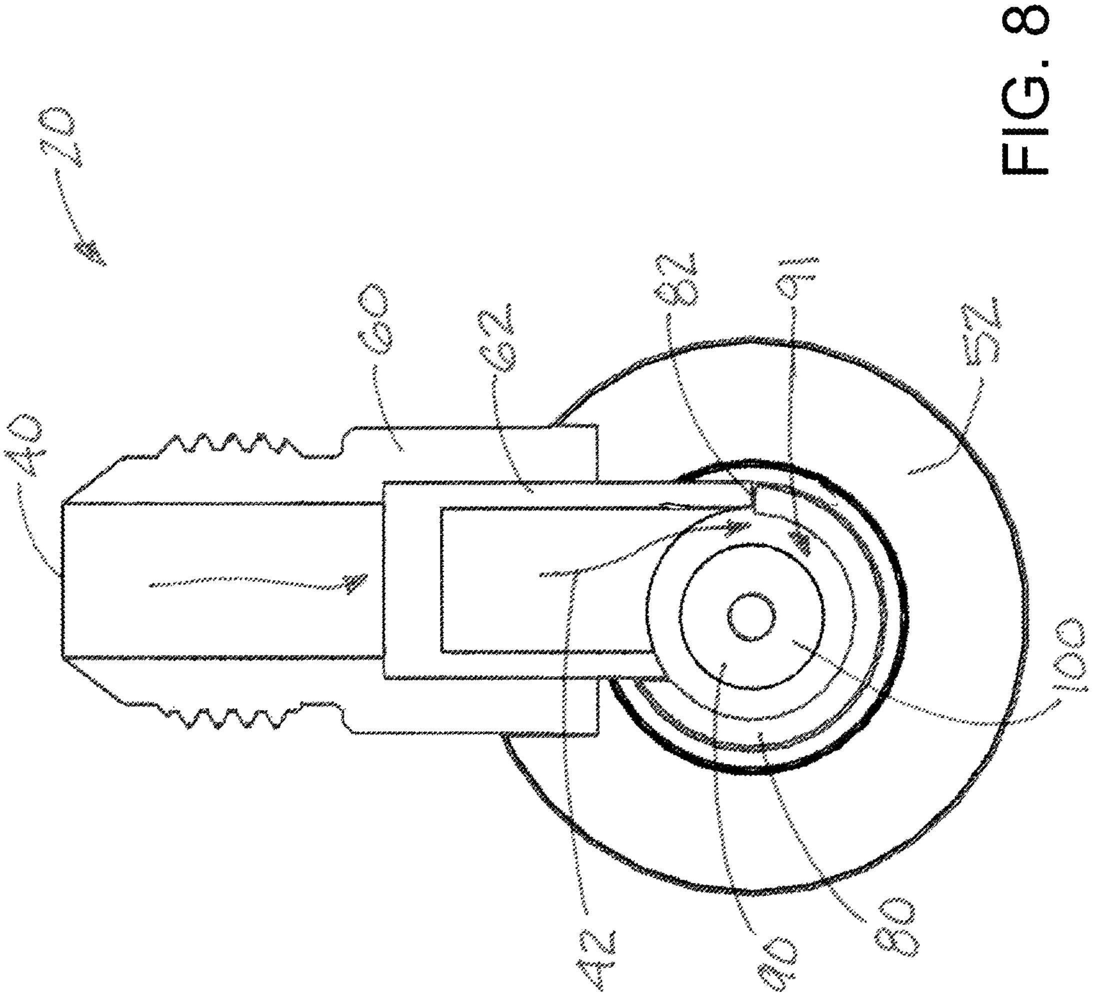
FIG. 8 is a schematic sectional view of the mixing device taken along line 8-8 of FIG. 1, according to an illustrative embodiment.
Figure 9:
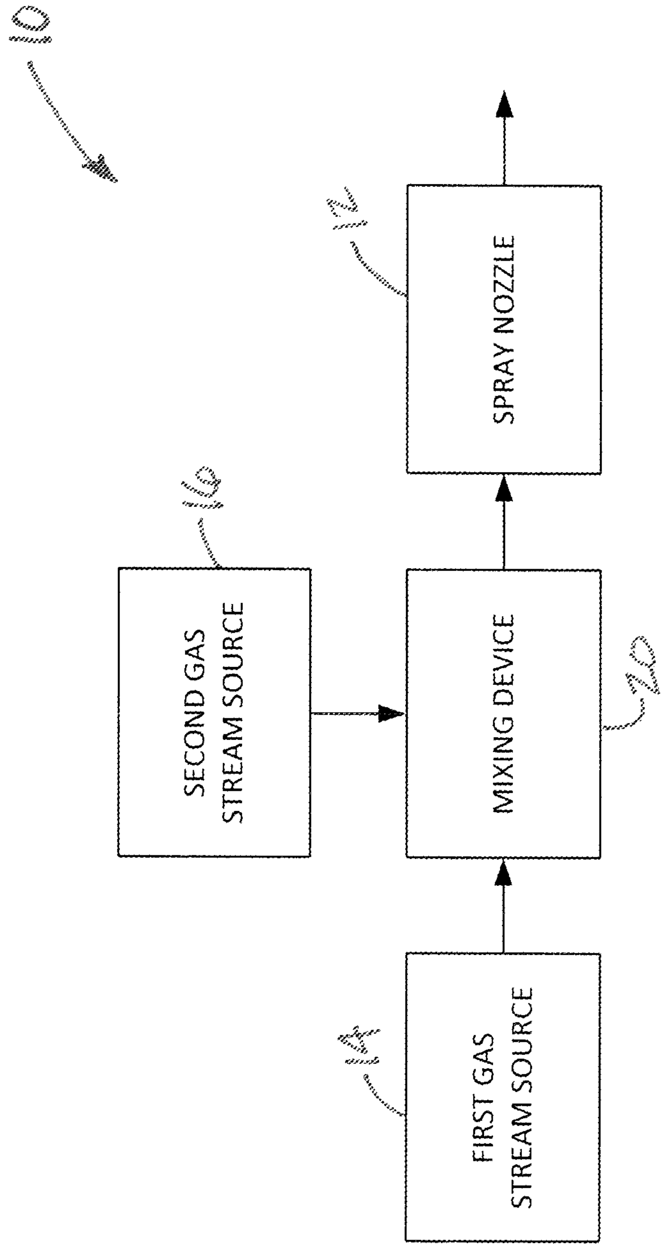
FIG. 9 is a schematic diagram of an apparatus including the mixing device, according to an illustrative embodiment.

With reference now to the drawings, and in particular to FIGS. 1 through 9 thereof, a new apparatus for mixing streams of gas and powder utilizing a vortex embodying the principles and concepts of the disclosed subject matter will be described.

The applicant has recognized that in particle application processes, such as a cold spray material deposition process, it would be advantageous to provide a stream of particles with a relatively wider spray spot (or area of particle dispersion on an impacted surface) than heretofore possible and with greater loading or quantity of particles in the stream, which in turn would provide dramatic reductions in the time required to spray coat an area of a surface with particles.

The applicant has developed a device for mixing particles in a larger gas stream that combines two pressurized gas streams in which at least one of the gas streams carries particles for a deposition process, and one of the gas streams may be heated. The device may form a primary gas path along which a first one of the gas streams moves substantially linearly through the device. The device may also form a secondary gas path with a section which surrounds the primary gas path and along which a second one of the gas streams is induced to rotate about the primary gas path as the second gas stream moves generally in the same direction as the first gas stream to a mixing chamber in which the rotating second gas stream is combined with the linear first gas stream, and the combined streams may then be provided to a spray nozzle for deposition. Concentric guide structures may be utilized to form portions of the primary and secondary gas paths. Advantageously, a distribution of powder is achieved in the spray spot of the nozzle that may be much more uniform than, for example, simple direct injection, and, as a consequence, not only requires a smaller percentage of overlap between adjacent spray deposition lines of movement across the surface to achieve uniform coating coverage, but also permits a higher powder loading or content carried in the stream. These benefits may improve the overall spray quality and reduce the spray time, particularly for coating larger parts. One highly advantageous application of the device of the disclosure is in a cold spray deposition process, and particularly for use in equipment utilized for performing cold spray deposition.

Further, the applicant has recognized that the profile of the powder distribution in the gas stream produced by devices having features of the disclosure, rather than being concentrated in the middle of the gas stream, is more uniformly distributed across the width of the profile of the gas stream, and may feature a greater concentration of particles at the periphery of the flow. This unique powder distribution may then be directed into a converging/diverging nozzle for deposition onto a surface.

In one aspect, disclosure relates to a powder spray applicator apparatus 10 which utilizes a gas stream to drive particles carried in the gas stream to impact against a surface.

The applicator apparatus 10 may include a spray nozzle 12 which may be the final element of the apparatus 10 influencing the dispensing or dispersal of the gas stream with particles. In some of the most preferred embodiments, the spray nozzle 12 is of the types having a passage with a converging/diverging geometry, although other types of spray nozzles may be suitable for use with aspects of the disclosure.

The apparatus 10 may also include a first conduit 14 which is configured to carry a first gas stream. The first gas stream may include a gas and carry a powder as a part of the flow of the gas stream to facilitate impacting a surface with the particles. Illustratively, the powder mass flow feed rate of the first gas flow may range up to approximately 30% of the total gas mass flow rate, although other particle contents may be used.

The apparatus 10 may further include a second conduit 16 which is configured to carry a second gas stream. The second gas stream may be a heated gas stream, and the temperature of the gas may illustratively be in the range of up to approximately 1000 C, although the temperature of the gas stream may be increased to approximately 1500 C with the addition of insulating and cooling features to the device disclosed herein. In some implementations, the range of temperatures may range from approximately 100 C to approximately 1000 C. The second gas stream typically has a higher gas flow rate than the flow rate of the first gas stream carrying the powder, and the second gas stream usually does not carry particles to be used in the deposition process.

A mixing device 20 of the applicator apparatus 10 may be provided to mix the first gas stream and the second gas stream into a combined or mixed gas stream which exits the device 20, and may be delivered to the spray nozzle 12. In illustrative embodiments, the mixing device 20 may be connected to the first conduit 14 and the second conduit 16 to deliver the first and second gas streams to the device 20, and may be connected to the spray nozzle 12 to permit the nozzle 12 to receive and dispense the mixed gas stream into the environment.

The mixing device 20 may be configured to create a vortex with the first and second gas streams in the device to mix the first and second gas streams (and powders carried therein) to form the mixed gas stream.

In greater detail, the mixing device 20 may have an input end 22 and an output end 24, and may have a central longitudinal axis 25 which extends in a longitudinal direction of the mixing device between the input 22 and output 24 ends. A central longitudinal plane 27 (see, e.g., FIG. 6) may extend along the central longitudinal axis 25 between the input 22 and output 24 ends. The device 20 may be tubular to pass at least one of the gas streams from the input end to the output end, and may have an input opening 26 located at the input end 22 and an output opening 28 located at the output end 24. The input end 22 of the device 20 may be configured to connect to the first conduit 14 to receive the first gas stream, and the output end 24 may be configured to connect to the spray nozzle 12. The output end 24 of the device may be configured to have the spray nozzle mounted on the output end so that the output opening 28 outputs the mixed gas stream to the nozzle 12. For the purposes of this description, elements closer to the input end 22 may be described as being "upstream" and elements relatively closer to the output end may be described as being "downstream."

The mixing device 20 may define a mixing chamber 30 which is in fluid communication with the input opening 26 and the output opening 28. The mixing chamber 30 may include a pre-mixing portion 32 and a vortex mixing portion 34, and the premixing portion 32 may be located toward the input end 22 of the device 20, and the vortex mixing portion may be located toward the output end 24. The mixing chamber 30 may be elongated and defined by an inner surface of the device 20, and in some embodiments the inner surface may be substantially cylindrical in shape and substantially uniform in diameter such that the premixing 32 and vortex mixing 34 portions of the mixing chamber have similar configurations. The mixing chamber 30 may be substantially bisected by the central longitudinal plane 27 of the mixing device.

The mixing device 20 may define a primary gas path 36 along which the first gas stream moves after passing through the input opening 26 of the end 22, and may extend toward the output opening 26 of the end 24 in a flow direction 38 extending from the input end toward the output end of the device 20. The primary gas path may extend through at least a portion of the mixing chamber 30, and may extend generally along the central longitudinal axis 25 of the mixing device.

The mixing device 20 may also have a secondary input opening 40 which may be offset from the central longitudinal plane 27 of the mixing device, and the central longitudinal plane may extend through a portion of the secondary input opening 40. The secondary input opening 40 may form a portion of a secondary gas path 42 along which the second gas stream moves through the device 20. The secondary gas path 42 may extend from the secondary input opening 40 toward the output opening 28, and may be in communication with the primary gas path 36 at or adjacent to the vortex mixing portion 34 of the mixing chamber to thereby join the first and second gas streams together to form the mixed gas stream.

In some embodiments, at least an initial section of the secondary gas path 42 may be oriented substantially perpendicular to the flow direction 38 of the primary gas path 36, and may also be oriented substantially perpendicular to the central longitudinal axis 25. A further and subsequent section of the secondary gas path 42 may be oriented substantially parallel to the flow direction 38 of gas path 36 and the central longitudinal axis 25, such that the gas path 42, and the second gas stream, changes direction of movement in the device 20. The further or subsequent section of the secondary gas path 42 may terminate at the vortex mixing portion 34 of the mixing chamber 30, and the initial section of the secondary gas path may terminate at the premixing portion 32 of the mixing chamber.

The initial section of the secondary gas path 42 may be oriented substantially parallel to the central longitudinal plane 27, and significantly the initial section may be located in an offset relationship with respect to the central longitudinal plane 27 on a first side of the plane 27. As a result, the second gas stream may enter the premixing portion 32 of the mixing chamber 30 at a location which is offset from the central longitudinal plane 27 and eccentric to the central longitudinal axis 25 which tends to produce a rotation of the second gas stream in the premixing portion 32 about the axis 25 as the gas stream also moves along the secondary gas path 42 in the longitudinal direction of the mixing device toward the vortex mixing portion 34 of the chamber 30. As the second gas stream reaches the vortex mixing portion 34, the second gas stream is rotating about the axis 25 and the first gas stream moving along the primary gas path 36

The mixing device 20 may also define a mixed gas path 44 which may extend from the vortex mixing portion 34 of the mixing chamber, where the first and second gas streams converge and are combined, to the output opening 28 at end 24 of the mixing device 20

In some embodiments, the mixing device 20 may include a mixer body 50 which may have a first end 52 and the second end 54. The first end 52 of the body 50 may be oriented toward the input end 22 of the device 20, and the second end 54 may be oriented toward the output end 24 of the device 20. Illustratively, the second end 54 may form the output end 24 of the device 20. The mixer body 50 may define a portion of the primary gas path 36, and may define a portion (or all) of the mixing chamber 30.

In greater detail, the mixer body 50 may include a main portion 56 which may form at least a portion of the mixing chamber 30, and may also form a section of the primary gas path. The main portion 56 may extend from the second end 54 of the mixer body towards the first end 52. The main portion 56 may have a port 58 which is in communication with the mixing chamber 30. External threads may be formed on the main portion 56 towards the second end 54 of the body 50 for mounting the spray nozzle 12 thereon (or other flow receiving device).

The mixer body 50 may also include a secondary portion 60 which may define a section of the secondary gas path 42. The secondary portion 60 may extend from the main portion 56, and may be elongated in a direction oriented substantially perpendicular to the length of the main portion. The secondary portion 60 may be offset from the central longitudinal plane 27 to the first side and in the first direction with respect to the mixing device 20. The central longitudinal plane 27 may extend through the secondary portion 60 in an eccentric relationship. External threads may be formed on the secondary portion 60 adjacent to the secondary input opening 40 for permitting connection of a conduit, such as the second conduit 16, thereto. In some embodiments, the secondary portion 60 may be removable from the main portion 56.

The mixer body 50 may also include a port sleeve 62 which may extend from the secondary portion 60 to the port 58 in the main portion. The port sleeve 62 may define a section of the secondary gas path 42, and a section of the port sleeve may protrude into the mixing chamber 30. The port sleeve 62 may be offset from the central longitudinal plane 27 in the first direction to the first side of the mixing device 20. Optionally, the port sleeve 62 may be removable from the main portion 56 and/or the secondary portion 60. The mixer body 50 may further include an insert portion 64 which may define a section of the primary gas path 36. The insert portion 64 may extend from the first end 52 of the mixer body 50 toward the second end 54 of the body 50. A section of the insert portion may be inserted into the main portion 56 while another section of the insert portion may protrude from the main portion. Optionally, the insert portion 64 may be removable from the main portion. External threads may be formed on the insert portion 64 toward the first end 52 for mounting purposes.

The mixing device 20 may also include additional guidance elements for guidance of the first and second gas streams. The device 20 may include an outer gas guide 70 which is configured to guide the second gas stream toward the vortex mixing portion of the mixing chamber. The outer gas guide 70 may be positioned in the main portion 56 of the mixer body and may be located in the mixing chamber 30. The outer gas guide 70 may have an upstream end 72 oriented toward the input end 22 of the mixing device, and a downstream end 74 oriented toward the output end 24 of the device 20. The outer gas guide 70 has a length defined between the upstream 72 and downstream 74 ends. An upstream opening 76 of the outer gas guide 70 may be located at the upstream end 72 and a downstream opening 78 of the guide 70 may be located at the downstream end 74. The upstream end 72 may be located in the premixing portion 32 of the mixing chamber, and the downstream and may be located at or in the vortex mixing portion 34 of the chamber 30.

The outer gas guide 70 may be formed by a perimeter wall 80 extending between the upstream 72 and downstream 74 ends of the guide 70. The perimeter wall 80 of the guide 70 may be tubular in configuration, and may be substantially cylindrical in shape. A notch 82 may be formed in the outer gas guide 70 for receiving a portion of the port sleeve 62 of the mixer body 50. The notch 82 may be located at the upstream end 72 of the guide 70 and may extend toward the downstream end 74. The notch 82 may be offset from the central longitudinal plane 27 in the first direction, and the plane 27 may extend through the notch 82 eccentrically. The notch 82 may be formed in the perimeter wall 80 of the guide 70, and may be in communication with the upstream opening 72 of the guide 70.

The perimeter wall 80 may have an upstream end portion 84 located toward the upstream end 72 of the guide 70, a downstream end portion 86 located toward the downstream end 74 of the guide 70 and a medial portion 88 positioned between the upstream 84 and downstream 86 end portions. The upstream end portion 84 and downstream end portion 86 of the perimeter wall 80 may have thicknesses which are relatively thicker than the thickness of the wall 80 at the medial portion 88 of the wall 80. The relatively thicker wall at the upstream 84 and downstream 86 end portions may serve to position the outer gas guide 70 in the mixing chamber 30, and may be in contact with the inner surface forming the mixing chamber. The notch 82 may be located in the upstream end portion 84, and a section of the portion 84 may be located upstream of the port 58 and port sleeve 62.

The additional guidance elements of the mixing device 20 may also include an inner gas guide 90 which is configured to guide the first gas stream toward the vortex mixing portion 34 of the mixing chamber. The inner gas guide 90 may be mounted on the mixer body 50, and a portion of the guide 90 may extend into the mixing chamber 30. A portion of the inner gas guide 90 may be positioned in the outer gas guide 70, with that portion of inner guide 90 being substantially concentric with the outer guide 70 to provide concentric flows of the primary gas stream (in the inner gas guide) and the secondary gas stream (in the outer gas guide). An annular gap 91 may be formed between the inner 90 and outer 70 gas guides to form a portion of the secondary gas path 42. The position of the inner gas guide, and the degree to which the inner gas guide extends into the outer gas guide, may be adjustable to adjust the characteristics of the mixing performed by the mixing device. Illustratively, the inner gas guide 90 may extend in at least half of the length of the outer gas guide 70, and in some preferred embodiments may extend in at least 90% of the length of the outer gas guide. The inner gas guide 90 may extend from the input end 22 of the mixer device 20 toward the output end 24 thereof. In some embodiments, the inner gas guide 90 may extend out of the first end 52 of the mixer body 50.

The inner gas guide 90 may be configured to guide the first gas stream through the premixing portion 32 of the mixing chamber 30, and may be configured to maintain the first gas stream as a separate gas stream from the second gas stream in the premixing portion 32. The inner gas guide 90 may be configured to discharge the first gas stream into the vortex mixing portion 34 of the chamber 30. The inner gas guide 90 may extend through the upstream opening 76 at the upstream end of the outer gas guide to a location adjacent to the downstream end of the gas guide 90.

The inner gas guide has an intake end 92 oriented toward the input end 22 of the mixing device 20 and a discharge end 94 oriented toward the output end 24 of the device 20. The discharge end 94 may terminate in the mixing chamber, and more specifically may terminate in the vortex mixing portion 34 of chamber 30. The discharge end 94 may also be located adjacent to the downstream end 74 of the outer gas guide 70, and may be located in the guide 70.

The inner gas guide 90 may have an intake opening 96 located at the intake end 92, and a discharge opening 98 located at the discharge end 94. The inner gas guide 90 may be formed by a peripheral wall 100 extending between the intake 92 and discharge 94 ends. The peripheral wall 100 may have a thickness, and the thickness of the peripheral wall may taper thinner toward the discharge end 94 of guide 90 to enlarge the width of the annular gap 91. In some embodiments, the peripheral wall 100 may include an inner tube 102 and an outer shielding tube 104, with the inner tube being positioned in the outer shielding tube. The inner tube 102 may extend from the intake end 92 to the discharge end 94, and the outer shielding tube may extend from a location adjacent to the discharge end 94 toward the intake end 92. The intake end 92 may be located at the input end 22 of the mixing device 20. External threads may be formed on the inner gas guide 90 adjacent to the intake end 92 to facilitate connection of the first conduit to the mixing device 20.

The mixing device 20 may also include at least one spacer 106 which extends between the outer 70 and inner 90 gas guides for maintaining the annular gap 91 between the guides 70, 90. In some embodiments, a plurality of the spacers 106 may be utilized to maintain the annular gap, and each of the spacers may extend radially outwardly from the inner gas guide to the outer gas guide.

The various elements of the mixing device 20 may be able to be disassembled for cleaning and inspection, and may be replaceable for adjusting performance characteristics of the device as well as repair and maintenance.

In the mixing device 20 of the disclosure, movement of the powder-carrying first gas stream through the device may be maintained on a substantially linear path to a spray nozzle mounted on the device, and the relatively hotter and higher flow second gas flow may be used to create a vortex flow pattern in the mixing chamber by flowing the outer second gas flow around the inner concentric first gas flow. Centrifugal force may tend to drive larger particles in the first gas flow to the periphery of the mixed gas flow and to the periphery of the resulting spray pattern, creating a halo-type distribution of powder.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A mixing device for combining a first gas stream and a second gas stream into a mixed gas stream, the mixing device having an input opening for receiving the first gas stream, a secondary input opening for receiving the second gas stream, and an output opening for outputting the mixed gas stream;

the mixing device defining a mixing chamber including a pre-mixing portion and a vortex mixing portion, the mixing chamber being in fluid communication with the input opening and the output opening;

the mixing device defining a primary gas path along which the first gas stream moves, the primary gas path extending from the input opening to the vortex mixing portion of the mixing chamber;

the mixing device defining a secondary gas path along which the second gas stream moves, the secondary gas path extending from the secondary input opening to the vortex mixing portion of the mixing chamber, the secondary gas path being in communication with the primary gas path at the vortex mixing portion of the mixing chamber; and the mixing device comprising:

a mixer body defining at least one of the portions of the mixing chamber;

an outer gas guide positioned in the mixer body and being configured to guide the second gas stream through the premixing portion of the mixing chamber to the vortex mixing portion of the mixing chamber;

an inner gas guide at least partially positioned in the mixer body and being configured to guide the first gas stream through the premixing portion of the mixing chamber to the vortex mixing portion of the mixing chamber, the inner gas guide having a discharging end at the vortex mixing portion of the mixing chamber, the primary gas path having a substantially uniform width toward the discharging end of the inner gas guide; and wherein a portion of the inner gas guide is positioned in the outer gas guide in a substantially concentric relationship with the outer gas guide to form an annular gap between the inner and outer gas guides, the annular gap forming a portion of the secondary gas path about the primary gas path to create a vortex in the vortex mixing portion of the mixing chamber to mix the first and second gas streams.

2. The device of claim 1 wherein the primary gas path is substantially linear; and wherein at least an initial section of the secondary gas path is oriented substantially perpendicular to the primary gas path, a further section of the secondary gas path being oriented substantially parallel to the primary gas path.

3. The device of claim 2 wherein the initial section of the secondary gas path terminates at the premixing portion of the mixing chamber and the further section of the secondary gas path terminates at the vortex mixing portion of the mixing chamber.

4. The device of claim 1 wherein the inner gas guide is configured to maintain the first gas stream separate from the second gas stream in the premixing portion of the mixing chamber and to discharge the first gas stream into the vortex mixing portion of the mixing chamber to permit mixing of the first and second gas streams.

5. The device of claim 1 wherein the inner gas guide extends through an upstream opening at an upstream end of the outer gas guide to a point approximately at the downstream end of the outer gas guide.

6. The device of claim 1 wherein the mixing device defines a mixed gas path extending from the vortex mixing portion of the mixing chamber to the output opening of the mixing device.

7. The device of claim 6 wherein the output end of the mixing device is configured to communicate with a spray nozzle to transfer the mixed gas stream to the spray nozzle to dispense the mixed gas stream.

8. The device of claim 7 wherein the mixing device is configured to communicate with a first conduit to receive the first gas stream from the first conduit and with a second conduit to receive the second gas stream from the second conduit.

9. The device of claim 1 wherein the outer gas guide is tubular and substantially cylindrical in shape.

10. The device of claim 9 wherein the mixing chamber is defined by a substantially cylindrical inner surface, the outer gas guide being coaxial with the inner surface.

11. The device of claim 1 wherein the inner gas guide includes a peripheral wall extending from the input opening of the mixing device to the vortex mixing portion of the mixing chamber.

12. The device of claim 11 wherein the peripheral wall of the inner gas guide includes an inner tube and an outer shielding tube, the inner tube being positioned in the outer shielding tube.

13. A powder spray applicator apparatus comprising a spray nozzle;

a first conduit configured to carry a first gas stream;

a second conduit configured to carry a second gas stream;

a mixing device for combining the first gas stream and the second gas stream into a mixed gas stream, the mixing device having an input opening connected to the first conduit for receiving the first gas stream, a secondary input opening connected to the second conduit for receiving the second gas stream, and an output opening connected to the spray nozzle for outputting the mixed gas stream to the spray nozzle;

the mixing device defining a mixing chamber including a pre-mixing portion and a vortex mixing portion, the mixing chamber being in fluid communication with the input opening and the output opening;

the mixing device defining a primary gas path along which the first gas stream moves, the primary gas path extending from the input opening to the vortex mixing portion of the mixing chamber;

the mixing device defining a secondary gas path along which the second gas stream moves, the secondary gas path extending from the secondary input opening to the vortex mixing portion of the mixing chamber, the secondary gas path being in communication with the primary gas path at the vortex mixing portion of the mixing chamber; and the mixing device comprising:

a mixer body defining at least one of the portions of the mixing chamber;

an outer gas guide positioned in the mixer body and being configured to guide the second gas stream through the premixing portion of the mixing chamber to the vortex mixing portion of the mixing chamber;

an inner gas guide at least partially positioned in the mixer body and being configured to guide the first gas stream through the premixing portion of the mixing chamber to the vortex mixing portion of the mixing chamber, the inner gas guide having a discharging end at the vortex mixing portion of the mixing chamber, the primary gas path being substantially linear between the input opening and the discharging end of the inner gas guide and having a substantially uniform width from the input opening to the discharging end of the inner gas guide; and wherein a portion of the inner gas guide is positioned in the outer gas guide in a substantially concentric relationship with the outer gas guide to form an annular gap between the inner and outer gas guides, the annular gap forming a portion of the secondary gas path about the primary gas path to create a vortex in the vortex mixing portion of the mixing chamber to mix the first and second gas streams.

14. The apparatus of claim 13 wherein the spray nozzle comprises a converging and diverging nozzle.

15. The apparatus of claim 13 wherein the primary gas path of the mixing device is substantially linear; and wherein at least an initial section of the secondary gas path is oriented substantially perpendicular to the primary gas path, a further section of the secondary gas path being oriented substantially parallel to the primary gas path.

16. The apparatus of claim 15 wherein the initial section of the secondary gas path terminates at the premixing portion of the mixing chamber and the further section of the secondary gas path terminates at the vortex mixing portion of the mixing chamber.

17. The apparatus of claim 13 wherein the inner gas guide of the mixing device is configured to maintain the first gas stream separate from the second gas stream in the premixing portion of the mixing chamber and to discharge the first gas stream into the vortex mixing portion of the mixing chamber to permit mixing of the first and second gas streams.

18. A mixing device for combining a first gas stream and a second gas stream into a mixed gas stream, the mixing device having an input opening for receiving the first gas stream, a secondary input opening for receiving the second gas stream, and an output opening for outputting the mixed gas stream;

the mixing device defining a mixing chamber including a pre-mixing portion and a vortex mixing portion, the mixing chamber being in fluid communication with the input opening and the output opening;

the mixing device defining a primary gas path along which the first gas stream moves, the primary gas path extending from the input opening to the vortex mixing portion of the mixing chamber;

the mixing device defining a secondary gas path along which the second gas stream moves, the secondary gas path extending from the secondary input opening to the vortex mixing portion of the mixing chamber, the secondary gas path being in communication with the primary gas path at the vortex mixing portion of the mixing chamber; and the mixing device comprising:

a mixer body defining at least one of the portions of the mixing chamber;

an outer gas guide positioned in the mixer body and being configured to guide the second gas stream through the premixing portion of the mixing chamber to the vortex mixing portion of the mixing chamber;

an inner gas guide at least partially positioned in the mixer body and being configured to guide the first gas stream through the premixing portion of the mixing chamber to the vortex mixing portion of the mixing chamber; and wherein a portion of the inner gas guide is positioned in the outer gas guide in a substantially concentric relationship with the outer gas guide to form an annular gap between the inner and outer gas guides, the annular gap forming a portion of the secondary gas path about the primary gas path to create a vortex in the vortex mixing portion of the mixing chamber to mix the first and second gas streams;

wherein the inner gas guide includes a peripheral wall extending from the input opening of the mixing device to the vortex mixing portion of the mixing chamber; and wherein the peripheral wall of the inner gas guide includes an inner tube and an outer shielding tube, the inner tube being positioned in the outer shielding tube.

19. The device of claim 1 wherein the outer gas guide has an inward face extending from the vortex mixing portion of the mixing chamber toward the pre-mixing portion of the mixing chamber and about a portion of the inner gas guide, the inward face being substantially cylindrical in shape.

20. The device of claim 1 wherein the inner gas guide has a peripheral wall with an inner face defining the primary gas path from the discharging end toward the input opening of the mixing device, the inner face being substantially cylindrical in shape with a substantially uniform width.

21. The device of claim 20 wherein the peripheral wall of the inner gas guide has an outer face extending from the discharging end toward the input opening of the mixing device, the inner and outer faces defining a thickness of the peripheral wall, the thickness of the peripheral wall being tapered thinner toward the discharging end of the inner gas guide.

* * * * *